United States Patent Office.

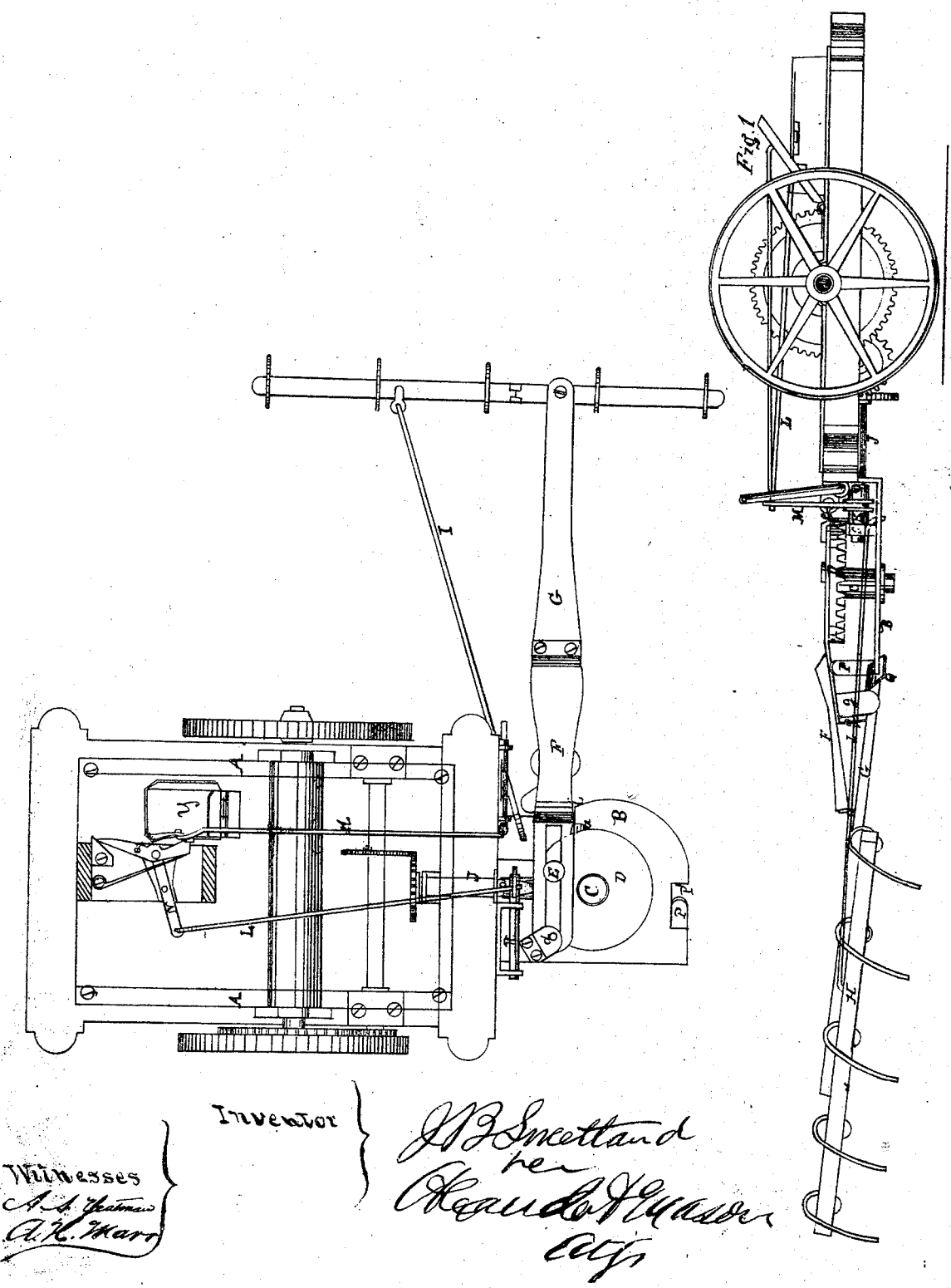

J. B. SWEETLAND, OF PONTIAC, MICHIGAN.

Letters Patent No. 71,816, dated December 3, 1867.

IMPROVEMENT IN HARVESTER-RAKES.

The Schedule referred to in these Letters Patent and making part of the same.

TO ALL WHOM IT MAY CONCERN:

Be it known that I, J. B. SWEETLAND, of Pontiac, in the county of Oakland, and in the State of Michigan, have invented certain new and useful Improvements in Adjustable Rake-Attachment for Reapers, and do hereby declare that the following is a full, clear, and exact description thereof, reference being had to the accompanying drawings, and to the letters of reference marked thereon.

In the annexed drawings, making part of this specification, A represents the frame of one of that class of reaping-machines which is provided with a dropper in rear of the platform for dropping the grain across the swath.

My invention relates to the rake, and its mode of attachment and operation in connection with a machine of the class above referred to.

Projecting from the rear of the frame A is a platform, B; and standing in a vertical position about the centre of this platform is a short shaft, C, said shaft having its bearing in the platform and a sleeve beneath it. Upon the upper end of this shaft C is a gear-wheel, D, said wheel having its teeth upon its under face. This wheel D gears into a pinion, S, upon the end of the shaft J, seen in red lines, fig. 2. The pinion S is made fast to a sleeve, K; and this sleeve either revolves or is made stationary upon the shaft, as the nature of the case requires. The sleeve is stationed, when desirable, upon the shaft J by means of a pin, $x$, which catches into a notch in the end of the sleeve.

H represents the rake, which is pivoted to the end of its arm, G; and this arm G is hinged, as seen, to another arm, F. The inner end of the arm F is pivoted to the upper end of a standard which is erected upon the platform B, as seen at $d$. This arm F has a long slot in it; and a headed pin, E, passing through said slot, confines the arm adjustably to the wheel D. When the wheel D revolves, its pin, E, plays in the slot of arm F, and causes said arm to give the rake-arm and rake a partial rotary motion backward and forward.

Upon the inner end of the arm G is a small pallet, Q, said pallet being hinged to the upper side of the arm, and its loose end inclining slightly downwards. $g\,g$ represent two guides, which project downward from the under side of arm F, to keep the arm G from straining its hinge when the rake is operating.

In the rear of the platform B is an opening, P', and standing upon one side of it is an inclined bar, P. The office of this bar is to depress the inner end of the arm G, so as to throw up the rake above the stubble in its backward passage.

In raking the grain, the under side of the inner end of arm G is above the platform B; but just as the rake has performed its office the arm G strikes the bar P, and is depressed until the pallet Q catches under the edge of the slot P', through which the end of the arm passes. As soon as the pallet catches under the edge of this slot, the end of the arm G is guided under the platform, and passes toward the machine, to be in position for raking again. Just before it reaches this position, a lug, $a$, upon the periphery of wheel D, strikes a lug on a lever, M, which straddles the sleeve K, and moves the sleeve so as to throw the wheel D out of gear. This stops the movement of the arm. As soon, however, as it is necessary to commence raking again, and the wheel D is thrown in gear, the arm G continues its backward course until it reaches the slot, $i$, in the platform, B. Its end immediately rises through this slot, and the rake H drops upon the grain, and, the arm moving backward again, the rake carries the grain from the swath.

It will be seen that, while this rake performs a circular movement with reference to the machine, it moves in almost a direct line across the swath.

This rake is thrown in and out of gear by the operator when he drops the grain upon the ground from the machine, and is done as follows: A rod, L runs forward from the lever M, and connects to a small bar, N, which has one end pivoted to a bar, O, while a pivot passes through the centre of bar N, connecting it to the reaper-frame A.

The bar O is operated upon by a foot-piece, Y. This foot-piece it is necessary to have on machines of this class, for it connects, by means of a rod, Z, to the dropping-device.

Now, when the operator moves the foot-piece Y, he at the same time throws the machine in gear through bars O and N, and rod L and lever M, and thus sets the rake in motion. The rake is thus set in motion at the proper time to rake up the grain which has just been dropped from the machine; and this it does while the machine is in progress. I represents a rod, which connects the rake H to the platform B in such a manner as to keep the rake always in proper position while moving for raking the grain straight across the swath.

What I claim as new, and desire to secure by Letters Patent, is—

1. The rake H, and arms G and F, used with the wheel D and platform B, and operating substantially as and for the purpose set forth.

2. The guide P and pallet Q, arranged in combination with the arms F and G and platform B, all constructed and operating as specified.

3. The arrangement of foot-piece Y with the bars O and N, rod L, lever M, and sleeve K, for throwing the rake in gear at the time the grain is dropped, substantially as herein represented.

In testimony that I claim the foregoing, I have hereunto set my hand, this 27th day of August, 1867.

J. B. SWEETLAND.

Witnesses:
A. N. MARR,
CORNELIUS COX.